United States Patent [19]
Meier

[11] 3,774,316
[45] Nov. 27, 1973

[54] AUTOMATIC TEACHING DEVICE

[76] Inventor: Hans Werner Meier, Bahnhofstrasse 32, Rapperswil, Switzerland

[22] Filed: May 24, 1971

[21] Appl. No.: 146,147

[30] Foreign Application Priority Data
May 26, 1970 Switzerland.................. 7826/70
Apr. 15, 1970 Germany.............. P 21 18 168.0

[52] U.S. Cl. ................................. 35/9 B, 35/8 A
[51] Int. Cl. ............................................ G09b 7/06
[58] Field of Search................ 35/8 A, 9 R, 9 A, 35/9 B, 9 E, 9 F, 35 C, 48 R

[56] References Cited
UNITED STATES PATENTS
3,497,966  3/1970  Gaven................................. 35/9 A
3,477,142  11/1969  Cornell et al...................... 35/9 A
3,315,373  4/1967  Diamond.......................... 35/9 A
3,353,280  11/1967  Emde................................. 35/9 A
3,399,469  9/1968  Nisbet................................ 35/48 R

FOREIGN PATENTS OR APPLICATIONS
1,027,828  4/1966  Great Britain.................. 35/35 C

*Primary Examiner*—Wm. H. Grieb
*Attorney*—Craig, Antonelli & Hill

[57] ABSTRACT

An automatic teaching device incorporating a tape recorder for playing back the instructional material and the questions and a control mechanism for checking the correctness of the answers given to the questions which have been posed. The invention contemplates providing a number of answers for each question, these answers being sub-divided into groups and arranged at an answer carrier. Each answer within a group is spatially associated with at least one answer key which is to be actuated by the student.

16 Claims, 7 Drawing Figures

AUTOMATIC TEACHING DEVICE

BACKGROUND OF THE INVENTION

The present invention relates to a new and improved automatic teaching device embodying a tape recorder for playing back the instructional material and the questions, and a control device for checking the accuracy of the answers given to the questions which have been posed.

Automatic teaching devices of the prior art which are capable of also checking the correctness and evaluating extensive answers are quite complicated in construction. If, for instance, the answers are introduced into the automatic teaching device with the aid of a key board then the text must be compared by means of a complicated mechanism having programmed answers, this mechanism must also take into account possible orthographic errors. Such automatic teaching devices, however, can generally only be operated and attended to by trained personnel. Additionally, programming of such automatic teaching devices is rather difficult. It is for these reasons that such prior art automatic teaching devices are only poorly suitable for use in elementary schools and private instructions.

SUMMARY OF THE INVENTION

Therefore, it will be comprehended from what has been explained above that the prior art is still in need of improved constructions of automatic teaching devices which are not associated with the aforementioned drawbacks. Hence, a primary objective of this invention is to provide just such automatic teaching device which effectively and reliably fulfills the existing need in the art.

Another and more specific object of the present invention relates to a provision of a new and improved automatic teaching device which is simple and easy to program and which can be used by the student without the assistance of trained personnel.

Now in keeping with the aforementioned objectives of this invention, there is contemplated that the automatic teaching device of this development has a number of answers for each question, these answers being divided into groups upon an answer or response carrier, the answers within the groups having spatially associated therewith answer keys which are to be actuated by the student.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
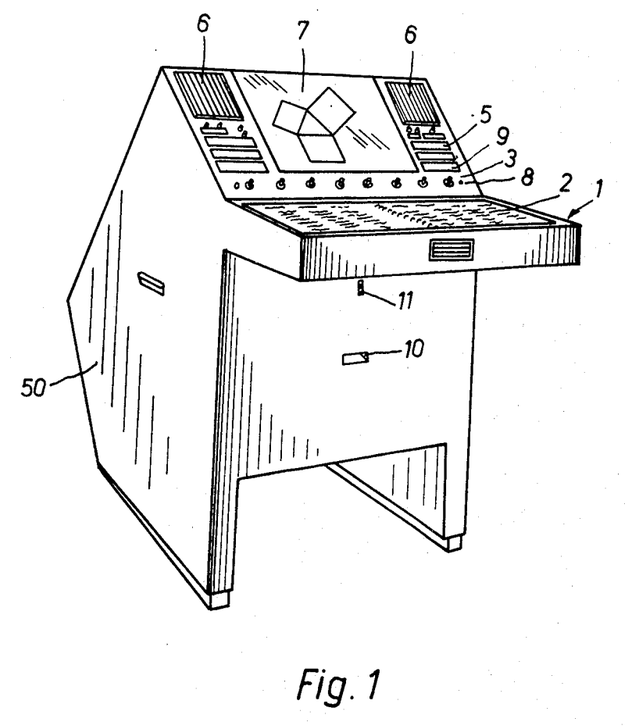
FIG. 1 is a perspective view of an automatic teaching device designed according to the teachings of the present invention and equipped with an image projection mechanism.
Figure 2:
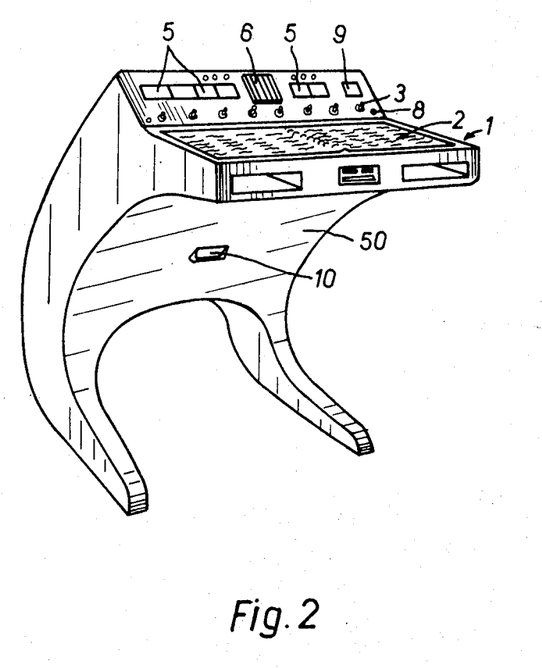
FIG. 2 is a perspective view of a modified automatic teaching device but this time without any image projection mechanism.

Describing now the drawings, in FIGS. 1 and 2 there have been depicted exemplary embodiments of automatic teaching devices designed according to the concepts of this development, and wherein the embodiment of FIG. 2 only differs from that shown in FIG. 1 through the absence of any image projection mechanism and further in the arrangement of the keys and indicator devices. Now in both these embodiments there is contemplated the provision of an operating console or desk, generally indicated by reference character 1, which is supported upon a cabinet or box-shaped base portion 50 containing the entire electronic regulating- and control mechanism. It will be seen that each such console or desk 1 incorporates a support table 2 for an answer carrier which here is in the form of a book containing a number of answers. Above the spport table 2 there are arranged the answer or response keys 3 associated, in a manner still to be described, with the answers of the answer book. At the front of the support table 2 there is provided a receiving or insert opening 4 for a tape cassette. Internally of each such automatic teaching device as depicted in FIGS. 1 and 2 there is provided any suitable locking mechanism which prevents removal of the tape cassette prior to completion of the teaching program.

Now at the operating console 1 there are arranged further indicator fields or zones 5, the exact function of which will be more fully explained hereinafter. Instructional material as well as questions are posed to the student via the loudspeakers 6. In the embodiment of FIG. 1 in addition to the spoken text there appears at the screen 7 a picture which is projected upon screen 7 by means of a non-visible slide projector located at the base 50, projection occurring thrugh the agency of a deflecting mirror for instance. The manner in which the image is produced and projected is of no real importance to the concepts of this development and suitable equipment for this purpose obviously is well known in this particular art. Furthermore, the projector is controlled so as to by synchronized with the tape recorder. Instead of transmitting the instructional material and the questions by means of the loudspeakers 6 such could also be listened to via earphones or a head set which can be electrically plugged into the equipment at the sockets 8.

An opening 10 is located beneath the support table 2 and dispenses a reqard to the student which may be in the form of chips, coupons or the like. In the case of the embodiment of FIG. 1 using a projection screen there is also located beneath the support table 2 a control knob 11 for regulating the intensity or brightness of the projected image.

Further, at the operating console 1 there is located an opening 9 past which moves a control strip of a recording device as will be more fully explained shortly.

Figure 3:
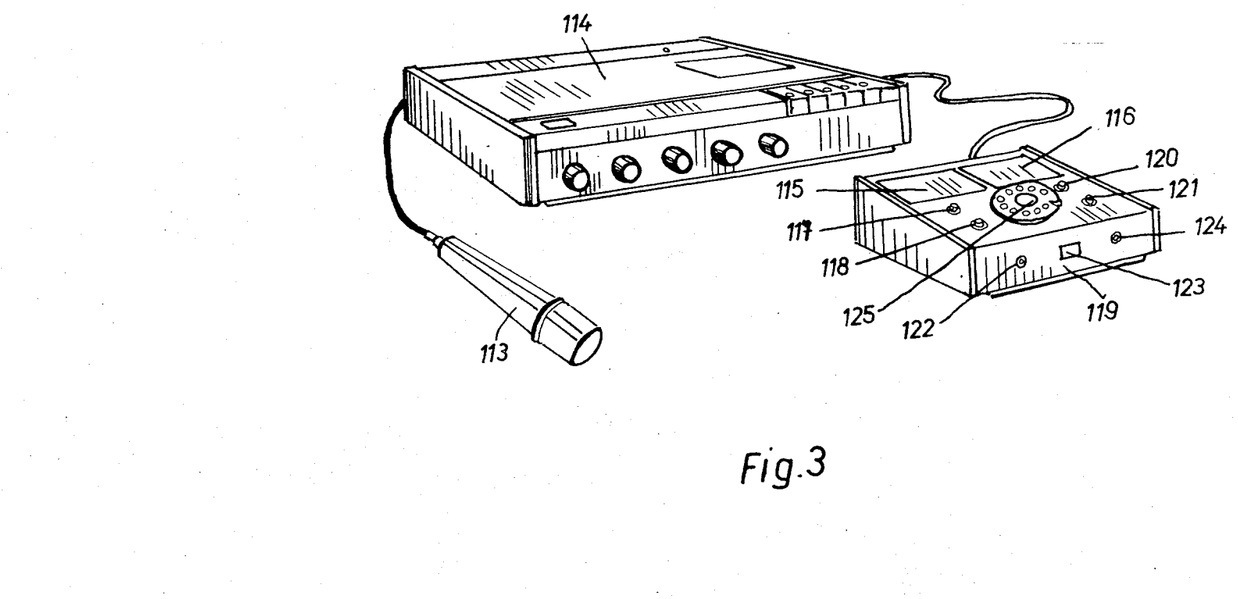
FIG. 3 is a perspective view of an apparatus for programming the automatic teaching device of this invention.

Now for the purpose of programming the described automatic teaching devices discussed above in conjunction with FIGS. 1 and 2, there is used the programming device 119 depicted in FIG. 3. Programming device 119 is coupled with a commercially available stereo tape recorder device 114 of the type using tape cassettes and equipped with microphone 113. Programming device 119 possesses two illuminated zones or fields 115 and 116, push buttons 117, 118, 120, 121, 122 and 124 as well as a selector disc 125. Two audio-frequency generators which are not particularly shown in FIG. 3 are mounted in the programming device 119, and specifically a respective generator for the control pulses and a respective generator for the answer control pulses. The answer control pulses are produced by the selector disc 125, the control pulses by the push buttons 118, 121 and 124. There is also housed at the programming device 119 a counter 123 which counts the programmed pulses for further switching the slide projector in order to always momentarily indicate to the programmer the exact portion or location of the program which he is confronted with at any given moment.

Programming can occur in such a manner that in synchronism with the posed questions there is controlled the control device for checking the answers. Thus, for instance, a first track of the tape is used for the control of the control device and for further control functions, whereas a second parallel sound track contains the instructional material and the questions.

It is also possible by means of the programming device 119 to program the automatic teaching device directly without a tape recorder, wherein then the control of the individual functions of the automatic teaching device occurs by means of a storage.

A further possibility for controlling the functions of the automatic teaching device resides in the use of a pre-programmed punched card or the like which can be incrementally scanned.

Figure 4:
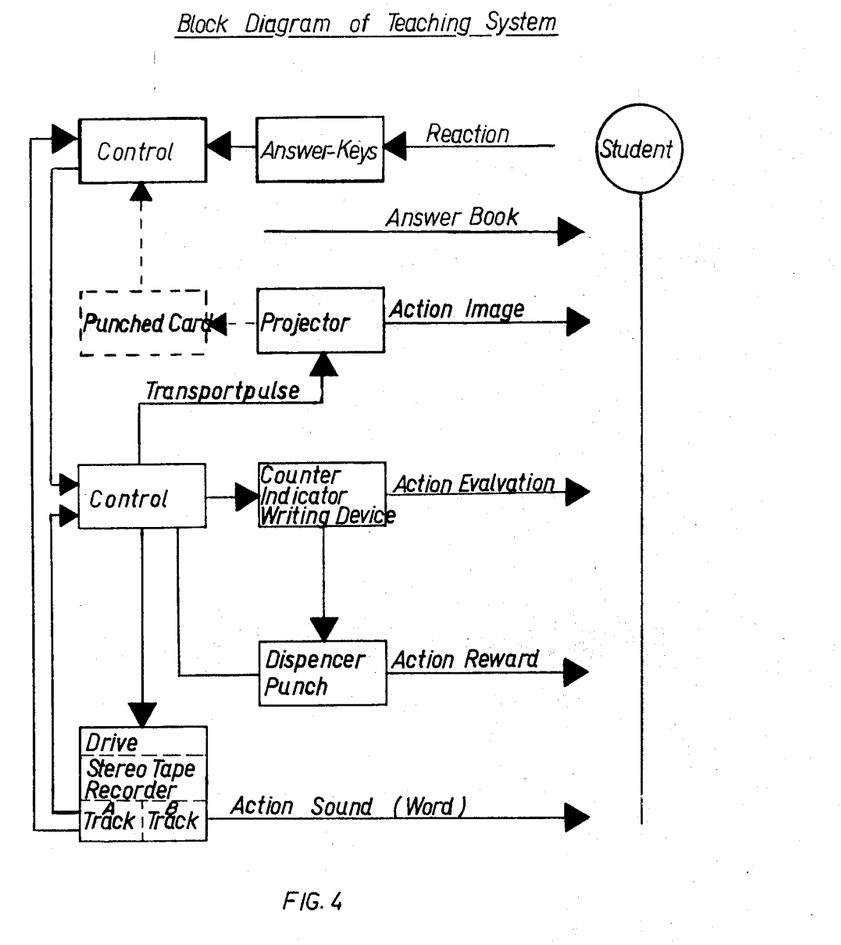
FIG. 4 is a schematic block diagram of the inventive automatic teaching devices depicted in FIGS. 1 and 2.

The block diagram of FIG. 4 shows the mode of operation of the automatic teaching device. Here all of the operational or functional steps carried out by the automatic teaching device are designated by the word "Action," the answers and reaction of the student by the term "Reaction." In this connection it is to be remarked that in the case of those constructions of automatic teaching devices as contemplated by this invention which work without an image projection mechanism and the elements associated with the "Action Image" obviously would then fall away.

The above-mentioned perforated card is shown in phantom lines in the block diagram of FIG. 4, the scanning of this perforated card then, in the case under consideration, would be synchronized with the projection of the image.

Figure 5:
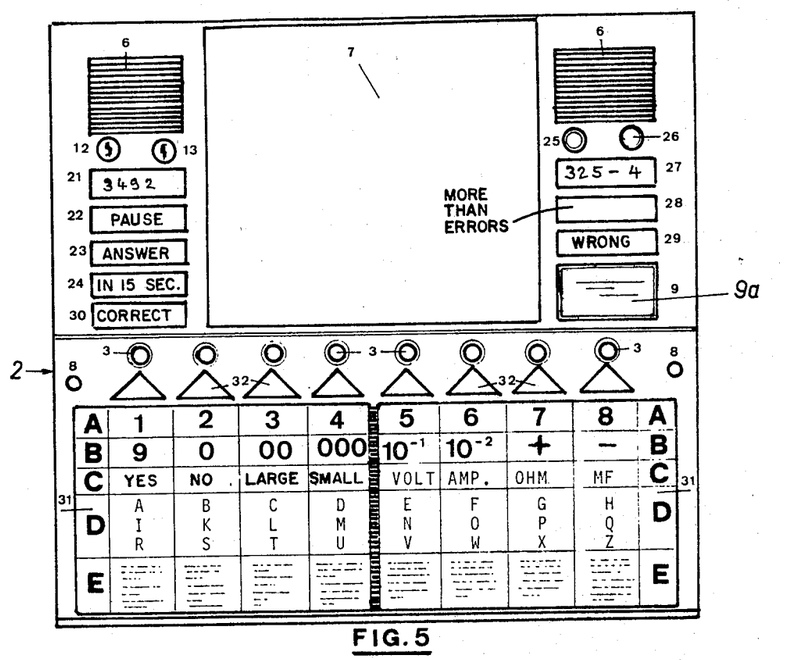
FIG. 5 is a front view of the operating console or desk of the automatic teaching device depicted in FIG. 1.

FIG. 5 is a front view of the operating desk or console 1 of the automatic teaching device depicted in FIG. 1, this arrangement also being analogously applicable for the operating console of the embodiment of FIG. 2. At the upper half of the operating console 2 there is located the screen 7 and laterally thereof the loudspeakers 6. Beneath the left loudspeaker 6 there is arranged two key switches 12 and 13 by means of which the automatic running of the teaching program can be influenced. Beneath such key switches 12 and 13 there are provided five indicator fields or zones 21, 22, 23, 24 and 30. The time needed by the student for correctly answering a question can be read-out at the indicator zone or field 21. The indicator zone 22 indicates the completion of a lesson, while the indicator zone or field 23 indicates the calling for the answer. The indicator zone 24 indicates how much time is available for answering a given question which has been posed, whereas the indicator field or zone 30 will illuminate upon correctly answering a question.

Now to the right of the screen 7 and beneath the loudspeaker 6 there are arranged two push buttons 25 and 26. Upon actuation of the push button 25 the automatic teaching device itself answers the posed question, whereby the appropriate reference or indication field 32 associated with the answer keys 3 illuminates. If the push button 26 is actuated then the question which has been posed is repeated. Now insofar as the indicator fields 27, 28, 29 and 9, located beneath such push buttons 25, 26 are concerned it will be understood that at the zone or field 27 a counter indicates the number of incorrect answers. On the other hand, the indicator zone or field 28 lights up as soon as the number of incorrect answers exceeds a given value. The indicator field or zone 29 indicates an incorrect answer. The control strip of a recording device is visible in the opening 9 located beneath the indicator field 29.

The aforementioned answer or response keys 3 together with the associated indicator zones or fields 32 are arranged in a line beneath the screen 7, wherein laterally of such answer keys 3 and indicator fields 32 there are mounted the sockets or sleeves 8 for receiving the connections to the earphones or head set.

An answer carrier, here shown in the form of an answer book 31, is placed upon the support table 2. In this book 31 there are noted a number of answers which are arranged in lines and columns. The answer book 31 is placed and fixedly retained upon the support table 2 in such a fashion that each answer column is aligned with one of the answer keys 3, as shown. The answer book 31 can be readily exchanged so that each answer can always be matched to the questions for the different teaching programs.

Figure 6:
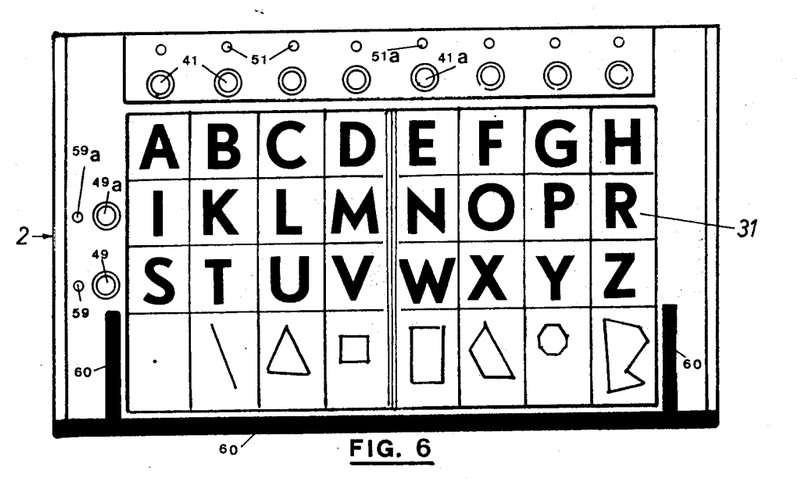
FIG. 6 is a front view of a further possible arrangement of the answer or response keys and their arrangement at an answer book.

FIG. 6 illustrates a further possible arrangement of answer keys and answer book at the operating console 1. The answer book, here also designated by reference character 31, placed upon the support table 2 is fixedly retained in releasable fashion in its position as placed upon such table at the lower and lateral regions of the support table by the provided contact rails 60. Just as was the case for the arrangement of FIG. 5, here also the answers are arranged in lines and columns, each column being in alignment with one of the answer or response keys 41 which are arranged in a line, whereas the two centrally located answer lines are in alignment with a respective one of the answer keys 49 which form a column. A respective lamp 51 and 59 is associated with each of the answer keys 41 and 49.

Each answer arranged in the lines and columns must have associated therewith at least one answer key, although as shown in the arrangement of FIG. 6 it can be desired to have certain answers spatially associated with two different answer keys.

Instead of the arrangement depcited in FIG. 5 it would also be possible to have the answer keys located in a column instead of in a row, whereby then each answer key of the column would be aligned with a line of answers at the answer book 31.

The constructions of automatic teaching devices heretofore considered function as follows: by means of the loudspeakers 6 a question on the tape recording device is posed to the student. If necessary, there is simultaneously switched-in the projection device by a suitable control pulse, whereafter at the screen 7 there appears a picture which corresponds to the question. In synchronism with the posing of the question and by means of a pulse at the second tape track the control device is switched-on for the purpose of checking the answer which has been given. If the posing of the question has ended and the control device is ready for carrying out its checking operation, then by means of a further control signal at the second tape track the tape recording device or tape recorder is stopped. At the same time the indicator field 23 requests the answer from the student. With the embodiment of FIG. 5 during such time as the question is posed there is indicated to the student the line where he must loook for the correct answer. If the correct answer for instance is "large," then the student is informed that he should answer in accordance with line C of the answer book 31. To provide the correct answer to this question the response key 3, located over the third column, must be depressed. With the embodiment of FIG. 6 it is not indicated to the student the line where he can find the correct answer. Hence, if in this embodiment the correct answer to the question posed is, for instance, "N," then, the student must first depress the key 49a and then the key 41a. If the question has been correctly answered then the indicator field or zone 30 lights up, whereas if a question has been incorrectly answered then the indicator field 29 illuminates. In the case of an incorrect answer simultaneous to the illumination of the indicator field or zone 29 the counter visible in the indicator field 27 indexes by one counting step. The automatic teaching device is equipped with a time measuring device which measures the amount of time required for giving an answer and portrays such at the indicator field 21. In the event the student wishes the question to be repeated then he can depress the key 26. Upon depressing the other key 25 the automatic teaching device will itself answer the posed question. If the automatic teaching device answers the posed question for the construction of FIG. 5 then the indicator field 32 will illuminate, whereas with the embodiment of FIG. 6 the lamps 51 and 59 will illuminate, in each case for the given question being answered. If the question which has been posed has been correctly answered then the tape recorder will again switch-in and the teaching program continues.

To prevent indiscriminate depression of one answer key after the other by a student there is advantageously provided a blocking mechanism which blocks for a certain period of time the answer keys after an incorrect answer has been given. At the same time there can be, for instance, repeated the question. As soon as the answer keys have once again been released then the indicator field or zone 23 again illuminates.

Further devices are provided which prevent destruction or impairment of the correct mode of operation of the control device through simultaneous depression or activation of a number of answer or response keys.

The amount of time available for giving an answer can be limited by a control circuit, the available time appearing then in the indicator zone or field 24. If this time is exceeded then either the "answer" will be evaluated as an incorrect one or the exceeded time indicated.

If the teaching program or lesson has been ended then the indicator field 22 illuminates. In the event that the student has correctly answered a number of questions which exceeds a given value or number, that is to say, if the student has not made a number of errors which exceeds a given value, then a reward marker or coupon, for instance a chip, can be dispensed through the opening 10 of the teaching device.

Apart from the above considered structure there are also provided circuits which render it impossible to impair the sychronization between the picture and the sound by incorrect manipulation or improper use of the equipment.

At the completion of a teaching program or lesson the instructor or teacher can read-out the efforts of the student at the indicator fields. Thus the indicator field 21 indicates the amount of time needed by the student for giving the answers and the indicator field 27 indicates the number of incorrect answers.

At the automatic teaching devices of the invention, apart from the tape recorder for playing back the instructional material and posing the questions there is also installed a second tape recorder. This second tape recorder possesses an endless revolving tape. By means of the second tape recorder the text played back by the first tape recorder is recorded upon the endless tape which synchronously travels along with the tape of the first tape recorder, the textual material thereby being continuously erased and again newly recorded. Depending upon the length of the endless tape there is recorded thereon always a more or less large portion of the text which has been played back by the first tape recorder. Thus, for instance, there can be used an endless tape upon which there is always recorded the text which has been played back within the last twenty seconds.

By means of a control circuit provided at the automatic teaching device, for instance a relay circuit, it is possible through the action of a control command to stop the first tape recorder at any desired location and simultaneously switch-over the second tape recorder to its "playback" mode. The endless tape is then scanned by the associated sound head and the recorded text is then played back through the agency of the loudspeakers or the earphones or head set. Upon completion of the playback of the endless tape then the second tape recorder is stopped. By means of a new control command this second tape recorder can be once again switched in and the same text can again be played back.

If the first tape recorder has been again switched-in by a suitable control pulse and therefore the teaching program continues, then simultaneously the second tape recorder is again switched-over into its "recording" mode, in order to record the text which has been played back by the first tape recorder.

At the operating console or desk 1 of the automatic teaching device it is possible to provide the required push buttons or other actuation switches by means of which there can be generated the control commands bringing about switching of the tape recorders.

In the embodiment depicted in FIGS. 1 and 5 it is possible for the student, by actuating the push button 26, to have a question which has been previously posed repeated for instance. As soon as the aforementioned push button 26 has been depressed, then as has been described above, the first tape recorder will be stopped, and the second tape recorder will be switched to "playback" and the question will be repeated. Upon completion of the question the second tape recorder also will be stopped. If the student desires the question to be repeated again then he has to push the button 26 again. If the student has correctly answered the question then the teaching program or lesson will be continued by virtue of the fact that the first tape recorder will be placed back into operation, and the textual material will then be recorded upon the endless tape of the second tape recorder as explained above.

Both tape recorders are controlled by the control circuit in such a fashion that when the first tape recorder plays back the second tape recorder records, whereas the second tape recorder, when the first tape recorder has been stopped, will playback the recorded textual material upon receipt of an appropriate command.

By using a second tape recorder in connection with a control circuit it is possible to repeat, one or more times, a portion of the instructional material or the questions without the first tape recorder having to be mechanically rewound.

In order to continuously indicate the progress of the student there is provided at the automatic teaching device an indicating or plotting mechanism incorporating a control strip, for instance formed of paper, and which can be written upon or inscripted at both sides and is movable past the opening 9 of the control console 1 through the action of a suitable transport mechanism. The front face of this control strip, schematically indicated at 9a in FIG. 5, can be used for recording an answer. In such case, the student will be requested when the question has been posed to write his answer upon the control strip 9a appearing at the window or opening 9. During such time as the student is writing his answer on the control strip 9a the transport mechanism for such strip will either be stopped by a pre-programmed pulse or, for instance, can be stopped in response to the pressure exerted by the writing implement upon a support or backing plate arranged behind the paper strip 9a. At the same time the rear face of the control strip 9a will be imprinted by a printing mechanism incorporating a number of stamps or punches. These stamps or punches which can be actuated, for instance, electromagnetically, are operably associated with individual control- and evaluation devices for the given answers, whereby the reaction of the student to the different questions which have been posed can be determined.

If the control strip 9a is always printed with a sign following a question and its answer, then with constant forward speed of the control strip it is possible to determine from the spatial spacing of two signs the time required by the student for giving an answer. Furthermore, with an appropriate punch or stamp there can be printed an indication whether the question which has been posed has been correctly or incorrectly answered and whether the student, through depression of the corresponding button at the operating console or desk 1, has requested repetition of the question or answering of the question by the automatic teaching device itself.

The automatic teaching devices of this invention can be additionally equipped, apart from the main teaching program, with a supplementary or auxiliary program which, whenever a question has been incorrectly answered, is switched-in and disseminates additional instructional material. If the student has successfully handled this additional instructional material, which can be checked by posing suitable questions, then the main teaching program is continued and the auxiliary or supplementary program is switched-off until the next incorrect answer has been given.

The instructional material of the auxiliary program is played back by an additional tape recorder which is synchronously controlled with a second projector which is installed in the automatic teaching device. The picture or image projected by the second projector appears at the same screen upon which also appears the picture of the main program. Since the projection axis of the second projector is displaced, in order to compensate for the non-linear distortion brought about by such displacement the pictures of the auxiliary program must be taken with a corresponding opposite distortion.

Now if a question played back by the tape recorder of the main teaching program has been incorrectly answered, then the tape recorder and projector of the main teaching program is stopped and the tape recorder and projector of the auxiliary program is switched-in. At the end of the auxiliary program further questions are posed to the student in order to ascertain if the student has really comprehended the instructional material of the auxiliary program. If such is the case then the tape recorder and projector of the auxiliary program are switched-off and the tape recorder and projector of the main program are again placed into operation. As mentioned above, upon incorrect answering of one of the following questions the auxiliary program is correspondingly again switched-in.

Now in conjunction with FIG. 3 there will be considered and described the programming of an automatic teaching device of the invention with a main teaching program and an auxiliary or supplementary program. In this regard, it is necessary to use two tape recorders 114 of the type depicted in FIG. 3, the microphone 113 then being switched-over in each instance to the corresponding tape recorder.

By actuating the start button 122 the programming device 119 is placed into operation. If the mainteaching program is to be programmed then the push button 117 is depressed or otherwise actuated, the illumination field or zone 115 lighting up. The text which is spoken into the microphone 113 is recorded by the first tape recorder. The pulses for further advancing or indexing a projector are produced by the push button 124, the counter 123 counting these pulses then being indexed by one number or count in each case. When the control pulse requiring the student to give his answer has been recorded at the tape recorder then the tape is stopped. Programming of the control device for the answer occurs by means of the selector disc 125 and the push buttons 118 and 121. In order to be able to continue with the programming operation it is necessary to again place into operation the tape recorder by once again actuating the start button 122. In the event it is desired to program the auxiliary or supplementary program then the push button 120 must be actuated or depressed. In so doing the illumination zone or field 116 lights up. Consequently, the second tape recorder is switched into operation and can be programmed in the same manner as above described.

By means of the push buttons 118 and 121 in conjunction with the selector disc 125 there is additionally produced the pulses which switch-in and switch-out the previously mentioned functions of the automatic teaching device associated with the giving of an answer, such as for instance limiting of the response time, stopping of the drive mechanism for the control strip, dispensing of reward markers, and so forth.

The automatic teaching devices of this invention can also be equipped with a control mecanism, by means of which the additional program steps at the automatic teaching device in certain situations can be adjusted or individual pre-programmed operations can be by-passed. With suitable switching circuits it is possible with such type control mechanism, for instance, to ensure that when a false answer has been given the teaching program is not interrupted until the correct answer is given, rather the program is switched immediately to the next question or that the student is requested to orally answer, the answer being recorded upon a separate tape provided for this purpose.

The automatic teaching devices of this invention can also be constructed and designed in such a fashion that a teaching device which reproduces a single picture and sound can be used in larger or smaller units for group instruction. With such type automatic teaching device the picture produced by the projector is projected upon a large projection screen located externally of the automatic teaching device. At a special socket of the teaching device there can be connected a distributor device by means of which a number of individual answer desks can be connected via cables. Similar to the arrangement of FIG. 6 each answer desk for each student is then equipped with an answer book and associated answer keys. Further, a counter circuit is installed at the answer desk or console which counts the correct and incorrect answers and upon reaching a predetermined number of correct or incorrect answers separates the answer desk in question from the central control. Lamps which are likewise arranged at the answer desk indicate in each case that an answer should be given and that, as the case may be, the answer desk has been switched-off.

The answer desks can be assembled together into groups, the central control being designed in such a fashion that each individual group is separately controlled and interrogated, whereby, however, only one of the students requested to give an answer can answer or only the first given answer will be taken into account.

Figure 7:
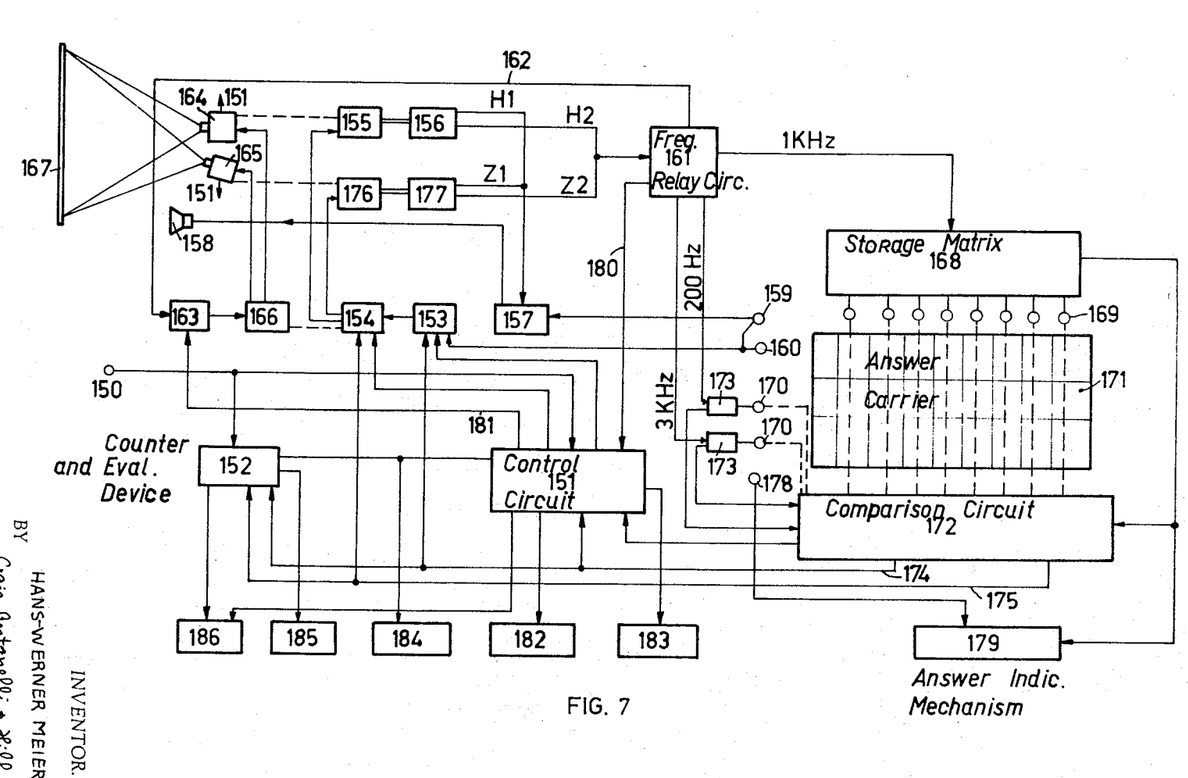
FIG. 7 is a circuit diagram of an exemplary embodiment of automatic teaching device designed according to this invention.

Now in conjunction with the block circuit diagram illustrated in FIG. 7 there will be more particularly described the circuit of an exemplary embodiment of automatic teaching device and further the mode of operation of the individual switching circuits thereof.

By actuating the "start"-button 150 there is switched-in the control circuit 151 and the counter- and evaluation device 152. The control circuit 151 actuates via the switch 153 for switching-in the tape recorder and the tape recorder reversing switch 154, the motor switch 155 which switches-in the motor of the first tape recorder for the main program 156. The first tape recorder 156 delivers the instructional text or material which has been recorded at the one tape track H1 which, on the one hand, is recorded by a second tape recorder 157 equipped with an endless tape and, on the other hand, is disseminated via the loudspeaker means 158 or the head set or earphones.

By actuating the repeat key 159 the student can switch-in the second tape recorder 157 and listen to the text which has been recorded upon the endless tape. At the same time the motor of the first tape recorder 156 is stopped by actuating the switch 153. The first tape recorder 156 can also be stopped, without switching-in the second tape recorder device 157, by actuating the "stop"-button or key 160.

The second track H2 of the first tape recorder 156 is provided with the control- and programming pulses which are delivered to the frequency relay circuit 161. A 50 Hz-control pulse is delivered by means of the line 162 from the frequency relay circuit 161 to the circuit 163 for forward indexing or switching both projection devices 164 and 165, such control pulse, depending upon the position of the reversing switch 166, either being delivered to the projection device 164 for the main program or to the projection device 165 for the auxiliary program. In each instance the control projection devices 164 or 165 always project an image upon the common projection screen 167.

If questions are posed to the student by means of the tape recorder then simultaneous with the signal for giving an answer there is also controlled the storage matrix 168, which can be a stepping switching relay or a toroidal core storage. Further, the drive motor of the tape recorder which is in operation is then switched-off. Giving of the answer to the question which has been posed occurs by actuating the appropriate horizontally arranged answer key 169 and the vertically arranged answer key 170. As previously explained, each such answer key 169, 170 is spatially associated with a column and a line, respectively, of an answer carrier 171 provided with the various answers to the different questions.

The answer keys in the horizontal key row 169 which are to be actuated for responding to a question which has been posed are controlled by the storage matrix 168, and the answer keys in the vertical key row 170 are controlled by the frequency relay circuit 161 through the agency of comparator elements 173.

The answer given by depressing the answer keys and appearing in the form of pulses are delivered to a comparison circuit 172. If the answer has been correctly given then the comparison circuit 172 transmits a so-called "correct"-pulse via the line 174 to the counter- and evaluation device 152 and to the switch 153 which again switches-in the motor of the tape recorder 156 of the main program, resulting in continuation of the teaching program.

In the case an incorrect answer is given then a so-called "incorrect"-pulse is delivered via the line 175 to the counter- and evaluation device 152 and to the tape recorder reversing switch 154. The reversing switch 154 causes, through the agency of the motor switch 176, a switching-over to the third tape recorder 177 for the auxiliary program, whereas the reversing switch 166 switches-in the projection device 165 for the auxiliary program. By means of an appropriate control signal delivered from the control circuit 151 this automatic switching-over to the auxiliary program can be suppressed. The individual tape tracks Z1 or Z2 of the third tape recorder device 177 now assume the previously described operations of the tape tracks H1 or H2 of the first tape recorder 156, and with which they are parallelly connected.

At the end of the auxiliary program a special pulse again switches the control circuit 151 and the reversing switches 154 and 166 to the main program.

Synchronization between the tape recorders 156 and 177 and between such tape recorders and the projection devices 164 and 165, respectively, associated therewith can be readily accomplished without difficulty since the tape recorders 156 and 177 never need be driven in a reverse travelling manner.

Synchronization between both reversing switches 154 and 166 is ensured in that they are arranged at the same relay armature.

By actuating the indicator button or key 178 the answer indicator mechanism 179 is actuated and which indicates the correct answer given to a posed question. By means of the answer indicator device or mechanism 179 there are switched-in glow lamps which illuminate the answer keys associated with the correct answer.

By means of the pulses delivered by the frequency relay circuit 161 to the control circuit 151 via the line 180, apart from the already explained control functions, further control functions are initiated. Thus, by means of the line or conductor 181 pulses are delivered to the circuit 163 which brings about correction of possible switching errors of the projection devices. Further, signals are delivered by the control circuit 151 to the different indicator zones or fields 182 which indicate to the student the request for giving an answer or indicate to such student individual program steps, such as for instance "auxiliary program," "response time limited," and so forth. Furthermore, by means of the control circuit 151 a timing or time counter 183 is controlled and which measures the amount of time required for giving an answer.

In the counter- and evaluation device 152 the false answers are counted and compared with a pre-programmed evaluation scale, whereupon then in the indicator field or zone 184 there is indicated the effort of the student and, if the situation warrants, possibly causes actuation of the dispensing device 185 for dispensing the reward markers or the like. A feedback from the counter- and evaluation device 152 to the control circuit 151, with an appropriate programming, can trigger suitable further operations.

All of the information delivered to the control circuit 151 and the counter- and evaluation device 152 are transmitted further to a plotting or indicating device 186 which, by means of the electro-magnetically actuated punchers, imprints upon a carrier such as the paper strip 9a, the different results which determine the efforts or grading of the student.

From the previously described block circuit diagram used for the inventive automatic teaching device and offering a number of application possibilities it is also possible to correspondingly derive the block circuit diagrams for simpler constructed automatic teaching devices.

The automatic teaching devices of this invention are advantageously constructed in accordance with the module or building block principle and can be easily accommodated to the momentarily encountered requirements. With automatic teaching devices of the described type it is possible to give programmed instructions in practically all fields. By virtue of the possibility of always posing to the student questions during or after the instructions and to check and indicate the correctness of the given answers, the attentiveness and learning capacity of the student can be increased and therefore his progress similarly increased. The motivation to study more intensely is given by the fact that reward markers are dispensed. Due to dispensing of these reward markers when a teaching program has been successfully completed and by eliminating all possibilities of influencing the automatic running of the teaching program there is simultaneously provided an automation of the teaching functions, rendering superfluous continuous monitoring of the student and, for instance, enabling within the confines of a classroom simultaneously operating a number of different automatic teaching devices. Owing to the simple programming system it is possible for the teacher, without having to give time-consuming instructions and operating complicated devices, to produce himself teaching programs and to accommodate such to the requirements of his school.

By using tapes with different instructional materials and text and by using the corresponding answer books it is possible to employ an automatic teaching device for different teaching programs. Switching over from one teaching program to a different teaching program can take place effortlessly by merely exchanging the tape and answer book.

While there is shown and described present preferred embodiments of the invention, it is to be distinctly understood that the invention is not limited thereto but may be otherwise variously embodied and practiced within the scope of the following claims. Accordingly,

What is claimed is:

1. An automatic teaching device comprising a tape recorder for playing back instructional material and questions, a control device for checking the answers given to a posed question by depressing at least one of a plurality of answer keys as to their correctness, an answer carrier having provided thereon a plurality of answers arranged one below the other and side-by-side in a plurality of columns and a plurality of lines, there being provided a plurality of answers for each question, said plurality of answer keys being arranged adjacent at least one side of the answer carrier, each of said answer keys being aligned with a respective one of at least one of said plurality of columns and said plurality of lines, whereby each answer is associated with at least one answer key aligned with one of the column and line containing the answer, said at least one answer key being depressed to indicate an answer to the posed question.

2. The automatic teaching device as defined in claim 1, wherein at least a predetermined number of said plurality of answers are associated with two answer keys, a first answer key being aligned with the column containing an answer and a second answer key being aligned with the line containing said answer, said first key and said second key being depressed to indicate an answer to the posed question.

3. The automatic teaching device as defined in claim 1, wherein the tape recorder has a drive, a control device which stops the drive of the tape recorder after each question has been posed, and places such drive again into operation after a correct answer has been given.

4. The automatic teaching device as defined in claim 1, further including a time measuring device for measuring the amount of time required by a student for answering a question.

5. The automatic teaching device as defined in claim 1, further including a blocking mechanism which blocks the answer keys for a certain time after a false answer has been given.

6. The automatic teaching device as defined in claim 1, further including a device which counts the false answers and when the number of false answers which have been counted is below a given value dispenses reward markers.

7. The automatic teaching device as defined in claim 1, further including a slide projection device synchronously controlled with the tape recorder.

8. The automatic teaching device as defined in claim 1, further including a device preventing removal of a tape from the tape recorder prior to termination of the teaching program.

9. The automatic teaching device as defined in claim 1, further including a control circuit in order to limit the amount of time available for giving an answer.

10. The automatic teaching device as defined in claim 1, further including an optical indicating device which can be switched-in and switched-out and which indicates a correct answer given to a posed question.

11. The automatic teaching device as defined in claim 1, further including a second tape recorder having an endless revolving tape and recording the sound played back by the first tape recorder, a control circuit arrangement which on the basis of control commands places the first tape recorder out of operation and actuates the second tape recorder such that it will play back the recorded sound.

12. The automatic teaching device as defined in claim 1, further including an indicator mechanism having a transport device for a control strip which can be imprinted at both faces, a printing mechanism equipped with a number of stamps, siad stamps imprinting one face of the control strip in accordance with the given answer.

13. The automatic teaching device as defined in claim 1, further including at least one light associated with each answer key and a further key which upon depression controls the energization of the at least one light associated with the answer key to indicate the correct answer for aposed question.

14. The automatic teaching device as defined in claim 1, including means for indicating to the student one of the line and column in which the plurality of answers to the posed question is arranged.

15. An automatic teaching device comprising a first tape recorder for playing back the instructional material and questions and a control device for checking the answers given to the posed questions as to their correctness, there being provided a number of answers for each question, these number of answers being divided into groups and arranged at an answer carrier, and wherein each answer within a group is spatially associated with at least one answer key which is to be actuated by the student, a second tape recorder having an endless revolving tap and recording the sound played back by the first tape recorder, a control circuit arrangement which on the basis of control commands places the first tape recorder out of operation and actuates the second tape recorder such that it will play back the recorded sound, a third tape recorder for playing back instructional material and questions, and a reversing switch mechanism which upon determining a false answer, during a certain period of time, stops the first tape recorder and switches-in the third tape recorder.

16. The automatic teaching device as defined in claim 15, further including a slide projector controlled by the third tape recorder.

* * * * *